(12) United States Patent
Simonazzi (10) Patent No.: US 9,941,633 B2
(45) Date of Patent: Apr. 10, 2018

(54) CONNECTOR FOR THE CONNECTION TO THE ON-BOARD DIAGNOSTICS OF A VEHICLE

(71) Applicant: Meta System S.p.A., Reggio Emilia (IT)

(72) Inventor: Giuseppe Simonazzi, Reggio Emilia (IT)

(73) Assignee: Meta System S.p.A., Reggio Emilia (IT)

( * ) Notice: Subject to any disclaimer, the term of this patent is extended or adjusted under 35 U.S.C. 154(b) by 31 days.

(21) Appl. No.: 14/778,526

(22) PCT Filed: Mar. 13, 2014

(86) PCT No.: PCT/IB2014/059717
§ 371 (c)(1),
(2) Date: Sep. 18, 2015

(87) PCT Pub. No.: WO2014/147530
PCT Pub. Date: Sep. 25, 2014

(65) Prior Publication Data
US 2016/0226189 A1  Aug. 4, 2016

(30) Foreign Application Priority Data
Mar. 18, 2013 (IT) .............................. MO2013A0071

(51) Int. Cl.
*H01R 13/639* (2006.01)
*H01R 13/66* (2006.01)
(Continued)

(52) U.S. Cl.
CPC .......... *H01R 13/639* (2013.01); *B60R 16/02* (2013.01); *H01R 13/6272* (2013.01);
(Continued)

(58) Field of Classification Search
CPC .................................................. H01R 13/639
(Continued)

(56) References Cited

U.S. PATENT DOCUMENTS 3,731,257 A * 5/1973 Bakker .................. H01R 13/46
439/142
5,647,757 A * 7/1997 Chrysostomou ... H01R 13/6271
439/188

(Continued)

FOREIGN PATENT DOCUMENTS

FR     2947963 A1    1/2011
WO  2004/042877 A1  5/2004

OTHER PUBLICATIONS

Emmanuel Bouhana, WIPO, European International Search Authority, International Search Report dated Nov. 5, 2014 in International Patent Application No. PCT/IB2014/059717, 4 pages.

*Primary Examiner* — Briggitte R Hammond (57) ABSTRACT

The connector (1) for the connection to the on-board diagnostics of a vehicle, comprising a container body (2) associable with an electronic connection port (A) of an on-board diagnostic system of a vehicle, a plurality of electrical terminals (3) supported by the container body (2) and connectable to corresponding electrical terminals (B) of the connection port (A), at least a protruding element (4) associated with the container body (2) and engageable in correspondence of at least a respective locator element (C) onto the connection port (A), and blocking means (5) of the protruding element (4) in correspondence of the locator element (C), able to prevent undesired disconnections of the connector itself from the connection port (A).

10 Claims, 6 Drawing Sheets

(51) Int. Cl.
*H01R 13/627* (2006.01)
*B60R 16/02* (2006.01)
*H01R 43/20* (2006.01)

(52) U.S. Cl.
CPC ..... *H01R 13/6275* (2013.01); *H01R 13/6691* (2013.01); *H01R 43/205* (2013.01); *H01R 2201/20* (2013.01); *H01R 2201/26* (2013.01)

(58) Field of Classification Search
USPC ........................................................ 439/352
See application file for complete search history.

(56) References Cited

U.S. PATENT DOCUMENTS

| | | | | |
|---|---|---|---|---|
| 5,993,230 | A * | 11/1999 | Gauker | H01R 13/7032 200/51.1 |
| 6,276,953 | B1 * | 8/2001 | Gauker | H01R 13/7032 439/188 |
| 6,896,538 | B2 * | 5/2005 | Grubbs | H01R 13/52 439/352 |
| 2002/0090838 | A1 * | 7/2002 | Bannier | B60K 37/02 439/34 |
| 2002/0151192 | A1 * | 10/2002 | Canuto | B60R 16/027 439/34 |
| 2006/0027394 | A1 * | 2/2006 | Brandenburg | G01R 3/00 174/251 |
| 2007/0155209 | A1 | 7/2007 | Takahashi | |
| 2008/0090426 | A1 * | 4/2008 | Lutsch | H01R 13/743 439/34 |

* cited by examiner

CONNECTOR FOR THE CONNECTION TO THE ON-BOARD DIAGNOSTICS OF A VEHICLE

RELATED APPLICATIONS

This application is a national phase application under 35 U.S.C. § 371 of International Patent Application No. PCT/IB2014/059717, filed on Mar. 13, 2014, entitled "CONNECTOR FOR THE CONNECTION TO THE ON-BOARD DIAGNOSTICS OF A VEHICLE", and claims priority under 35 U.S.C. § 119 to Italian Patent Application No. MO2013A000071 filed on Mar. 18, 2013, which are hereby expressly incorporated by reference in their entirety for all purposes.

TECHNICAL FIELD

The present invention relates to a connector for the connection to the on-board diagnostics of a vehicle, in particular for the connection to on-board diagnostic systems according to the OBD (On-Board Diagnostics) standards.

BACKGROUND ART

The use of appropriate on-board diagnostic systems, called OBD (On-Board Diagnostics) systems, on motor vehicles and motorcycles is known, designed to detect and report any failure or malfunction of the vehicle.

In practice, the systems according to the OBD-II standard in the United States and the corresponding E-OBD standard in Europe are able to provide e.g. to a specialized technician within a garage during the overhaul of a vehicle, all information required to analyze the status of each subsystem of the vehicle itself.

The recent implementation of OBD systems employ a suitable digital communication port through which, once connected to a special external analysis unit, it is possible to find real-time information about the status of the vehicle, together with any report of faults and malfunctions of the vehicle by means of DTC (Diagnostic Trouble Codes) standard codes.

The OBD digital communication port meets predefined standards common to all models and makes of vehicles and can be connected to a diagnosis external unit by means of a respective connector.

It is also well known and increasingly widespread the use of monitoring equipment which can be installed on board of a vehicle and usable to detect the modes of use of the vehicle itself over time.

Such equipment may comprise a GPS locator, a GSM module and a motion sensor of the type of an accelerometer and find application, e.g., for assistance in case of failure or theft or in the insurance field, for the determination of customized rates on the basis of the actual use of the vehicle or for the determination and subsequent assessment of unexpected events such as accidents.

In particular, a specific type of such equipment is composed of a module enclosed in a suitable container and directly connectable to the OBD digital communication port.

In this way, the equipment is able to access a plurality of information available directly from the internal diagnostic system of the vehicle.

The OBD connectors of known type which can be connected to the digital communication port of the diagnostic system of a vehicle have, however, a number of drawbacks.

In fact, the OBD connectors of known type are made for occasional connections and for short connection times with a stationary vehicle and, therefore, have not been developed with specific retention systems to ensure the tightness with moving vehicles.

Therefore, the connector can disconnect from the relative communication port due to the common vibration that may occur during the normal transit of the vehicle or following accidental impact by the driver of the vehicle itself.

This problem is particularly felt with reference to the connectors used for the connection of the above mentioned monitoring equipment.

In this case, in fact, the possibility of an accidental and undesired detachment is even greater, because the connector must support the weight of the monitoring equipment and therefore is greatly affected with vibrations and oscillations of the equipment itself.

DESCRIPTION OF THE INVENTION

The main aim of the present invention is to provide a connector for the connection to the on-board diagnostics of a vehicle that is able to ensure a more firm and stable connection with the communication port of an on-board diagnostic system of a vehicle, compared to a connector of known type in which the blocking is obtained solely by means of friction between the components and a metal spring, so as to eliminate or, in any case, minimize the risk of accidental detachment.

Therefore, the object of the invention is to provide an OBD connector whose disconnection can take place only through a voluntary action by an operator. Another object of the present invention is to provide a connector for the connection to the on-board diagnostics of a vehicle which allows to overcome the mentioned drawbacks of the prior art in the ambit of a simple, rational, easy and effective to use as well as economic solution.

The above objects are achieved by the present connector for the connection to the on-board diagnostics of a vehicle, comprising a container body associable with an electronic connection port of an on-board diagnostic system of a vehicle, a plurality of electrical terminals supported by said container body and connectable to corresponding electrical terminals of said connection port, at least a protruding element associated with said container body and engageable in correspondence of at least a respective locator element onto said connection port, characterized in that it comprises blocking means of said protruding element in correspondence of said locator element, able to prevent undesired disconnections of the connector itself from the connection port.

BRIEF DESCRIPTION OF THE DRAWINGS

Other characteristics and advantages of the present invention will become evident from the description of a preferred, but not exclusive, embodiment of a connector for the connection to the on-board diagnostics of a vehicle, illustrated by way of an indicative, but not limitative, example in the accompanying drawings in which.

EMBODIMENTS OF THE INVENTION

With particular reference to such figures, globally indicated by 1 is a connector connectable to a conventional electronic connection port A of an OBD on-board diagnostic system of a motor vehicle, a motorcycle or the like.

A possible first embodiment of the connector 1, shown in Figures from 1 to 8, is described below.

The connector 1 comprises a container body 2 shaped according to the conventional OBD standards and associable with the standard connection port A of an OBD on-board diagnostic system.

The container body 2 supports a plurality of electrical terminals 3 connectable to corresponding electrical terminals B of the connection port A.

Usefully, the connector 1 comprises a protruding element 4 suitably shaped and able to engage on a respective locator element C of the connection port A, when the connector itself is fitted on the connection port A.

In particular, the protruding element 4 can be made up of a suitably shaped tooth.

Advantageously, the connector 1 comprises blocking means, globally indicated in the illustrations by reference numeral 5, able to block the tooth 4 in correspondence of the locator element C of the connection port A.

In particular, the blocking means 5 comprise a mobile element 6 associated with the container body 2 and operatively connected to the tooth 4.

The mobile element 6 may be positioned in a stop position, wherein the tooth 4 is pressed and blocked in correspondence of the locator element C of the connection port A.

With not exclusive reference to a preferred embodiment of the connector 1, shown in the illustrations, the container body 2 comprises a flexible element 7 having the protruding element 4.

The mobile element 6 is associated sliding with the container body 2 between a disengagement position, wherein it is substantially spaced away from the tooth 4, and the stop position, wherein it is engaged on the flexible element 7, in the proximity of the tooth 4, to press and block the tooth itself in correspondence of the locator element C of the connection port A.

In particular, the flexible element 7 can be made up of a bending spring which extends substantially parallel to the direction of extension of the connector 1, from a rear portion of the container body 2 to a front portion of the container body 2.

Usefully, the spring 7 is composed of a flat and straight bending spring having a first extremity fixed to a rear portion of the container body 2 and a second opposite extremity having the tooth 4.

In particular, the tooth 4 is made in correspondence of the free extremity of the spring 7 and is directed towards the inside of the container body 2, facing an opening 8 obtained on a side wall of the container body itself.

Preferably, the spring 7 is made in a single body piece with the container body 2.

The blocking means 5 comprise guide means 9 able to guide the sliding of the mobile element 6 between the disengagement position and the stop position.

In particular, with reference to the embodiment of the connector 1 shown in the figures, the guide means 9 are composed of a straight guide made integral to the container body 2, in correspondence of the spring 7, which extends along the edges of the opening 8.

Preferably, the mobile element 6 has an elongated and plate-shaped conformation and is fitted inside the straight guide 9 axially sliding between the disengagement position and the stop position.

Alternative embodiments of the connector 1 different from that illustrated in the figures cannot however be ruled out.

The container body 2 may be e.g. without the spring 7 and the mobile element 6 can feature directly the tooth 4.

In this case, the mobile element 6 is associated sliding with the container body 2 between the disengagement position, wherein the tooth 4 is substantially spaced away from the locator element C on the connection port A, and the stop position, wherein the tooth 4 is arranged in correspondence of the locator element C.

Figure 1:
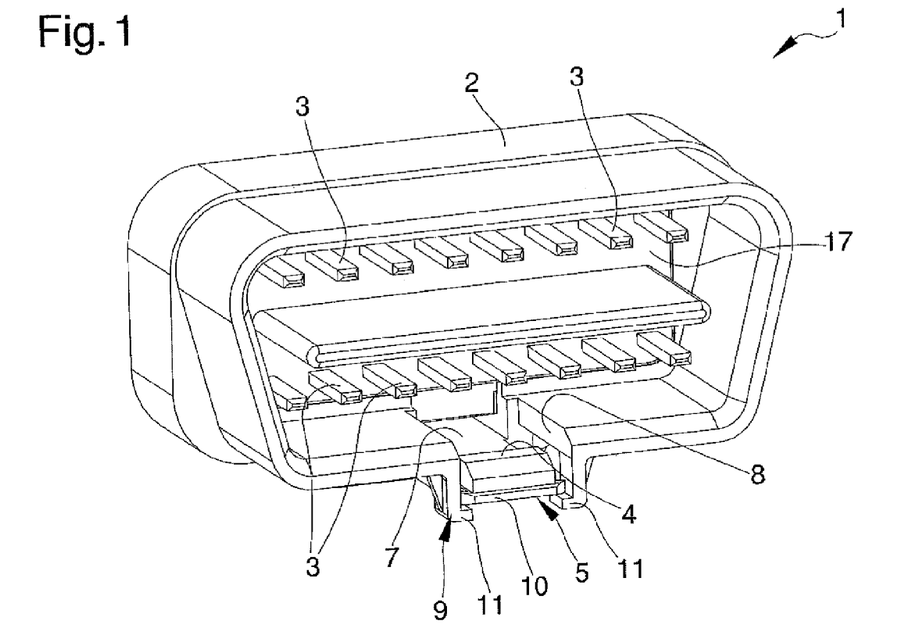
FIG. 1 is a front axonometric view of the connector according to the invention.
Figure 2:
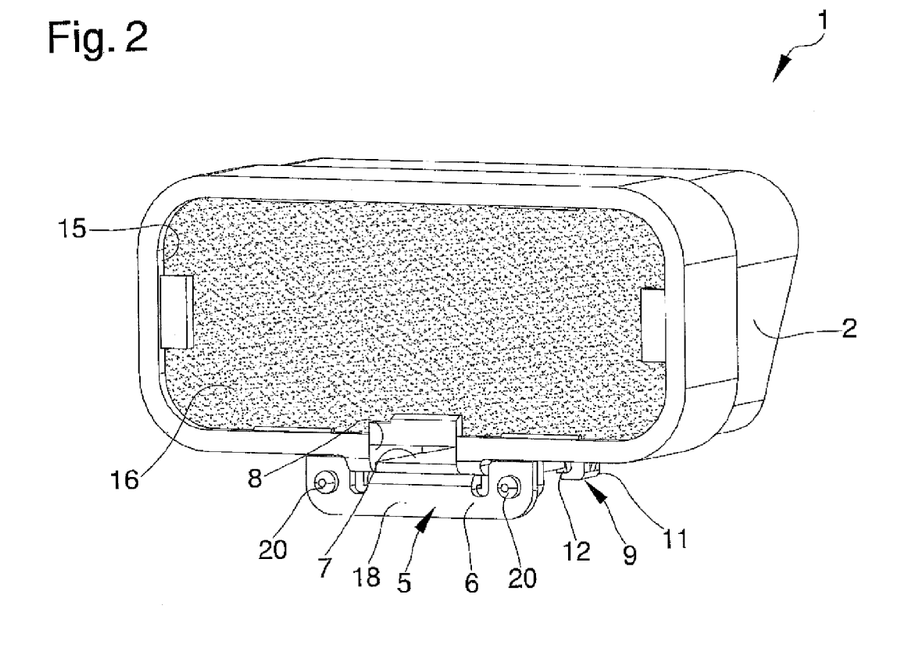
FIG. 2 is a rear axonometric view of the connector according to the invention.
Figure 3:
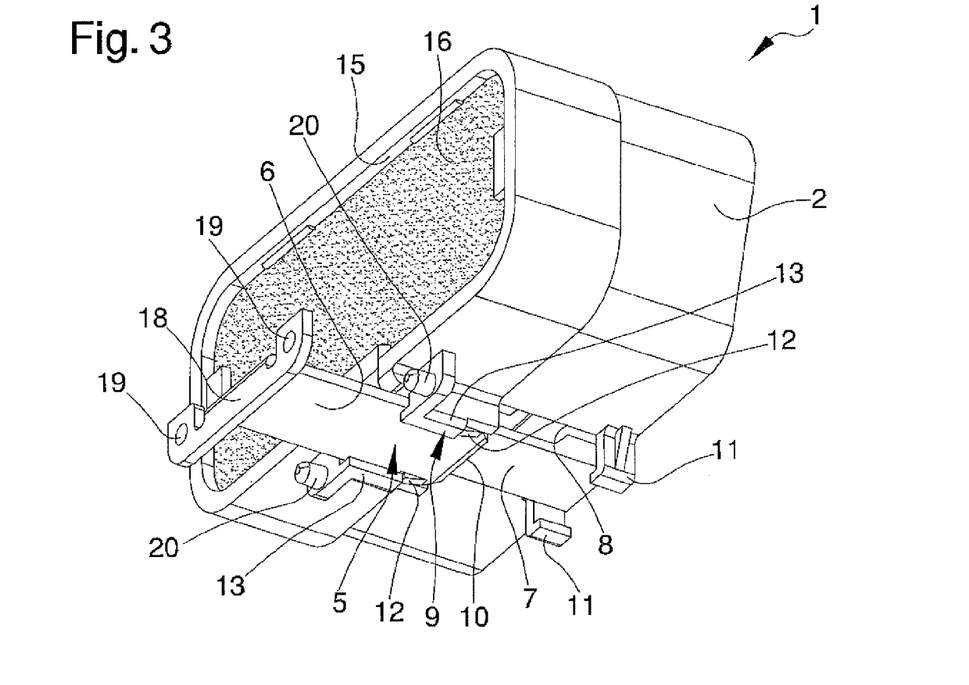
FIG. 3 is an axonometric view of the connector according to the invention with the mobile element of the blocking means in the disengagement position.
Figure 4:
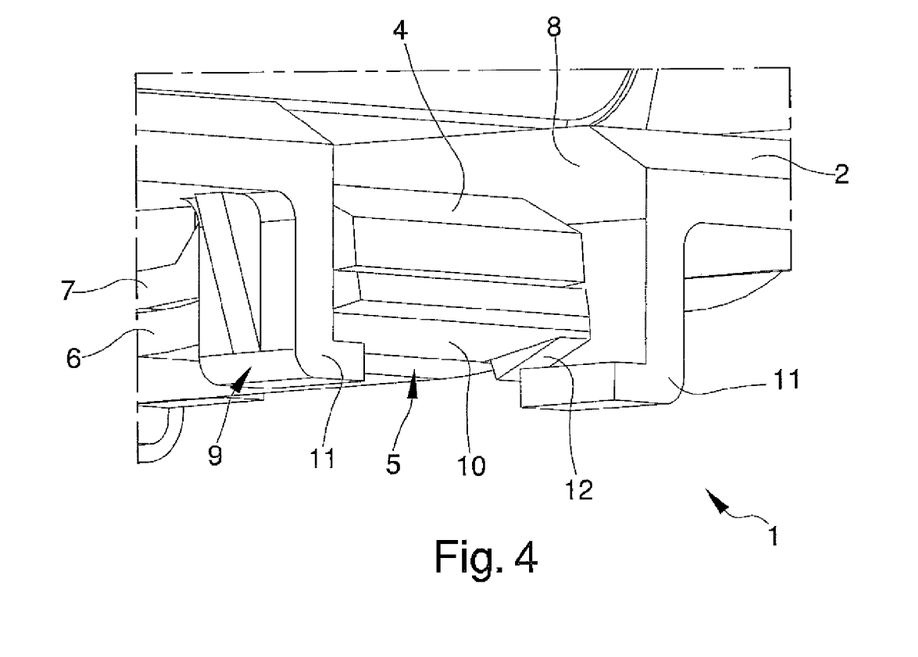
FIG. 4 is an axonometric view that shows a detail of the blocking means of the connector according to the invention.

Advantageously, the mobile element 6 comprises an extremal portion 10 able to engage in correspondence of a first section 11 of the straight guide 9, during the sliding from the disengagement position to the stop position, to bring the extremity of the mobile element 6 towards the locator element C of the connection port A, so as to press and block the tooth 4.

In particular, the extremal portion 10 is made in correspondence of the front extremity of the mobile element 6 and comprises a pair of notches 12 having respective inclined portions, or ramps.

The first section 11 is made in correspondence of the front portion of the straight guide 9 and is composed of two substantially L-shaped cantilevered elements extending from a wall of the container body 2, in correspondence of the edges of the opening 8.

The ramps of each of the notches 12 are able to engage in correspondence of the two cantilevered elements 11, when the mobile element 6 is in the stop position, so as to push the spring 7, and therefore the protruding element 4, towards the locator element C.

Usefully, in the disengagement position, each of the notches 12 is able to engage in correspondence of respective projections made in correspondence of a second section 13 of the straight guide 9.

Usefully, in correspondence of an extremity opposite to the extremal portion 10, the mobile element 6 has a gripping element 18.

Preferably, the gripping element 18 has a substantially plate-shaped conformation and is arranged perpendicular to the longitudinal axis of the mobile element itself.

In practice, the gripping element 18 performs the dual function of gripping handle, to facilitate the movement of the mobile element 6 between the disengagement position and the stop position, and of stop, being able to engage on a portion of the container body 2 when the mobile element 6 is in the stop position.

Usefully, the gripping element 18 may have appropriate through apertures 19 within which respective locking pins 20 engage to measure, which are made overhanging from the container body 2, when the mobile element 6 is in the stop position.

The connector 1 also comprises an electric circuit 14 housed within a suitable housing seat 15 of the container body 2, connected to the electrical terminals 3 and able to process the electric signals transmitted/received through the electrical terminals themselves.

Usefully, the housing seat 15 is substantially filled with at least a layer of insulating material 16, able to isolate and block the electric circuit 14.

The insulating material 16 can be composed, e.g., of a synthetic resin, silicone or similar materials.

Figure 5:
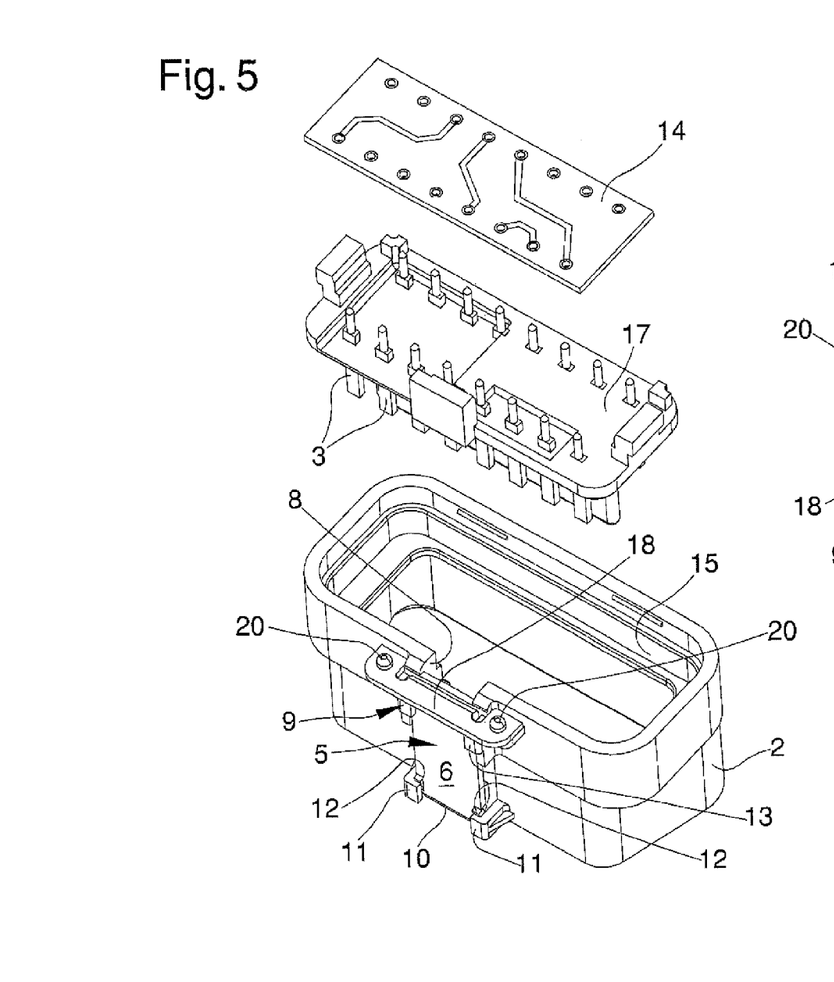
FIG. 5 and FIG. 6 schematically illustrate the procedure for making the connector according to the invention.
Figure 6:
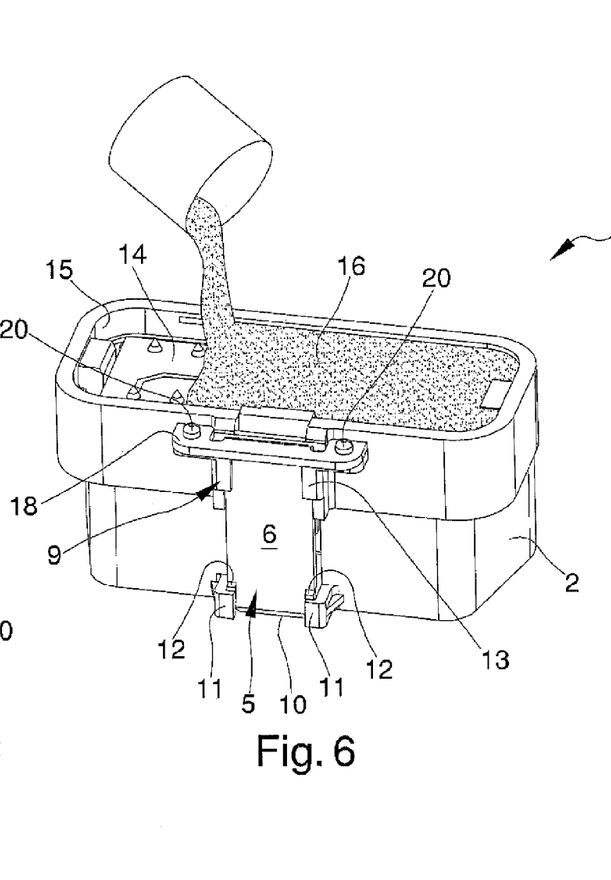
Figure 7:
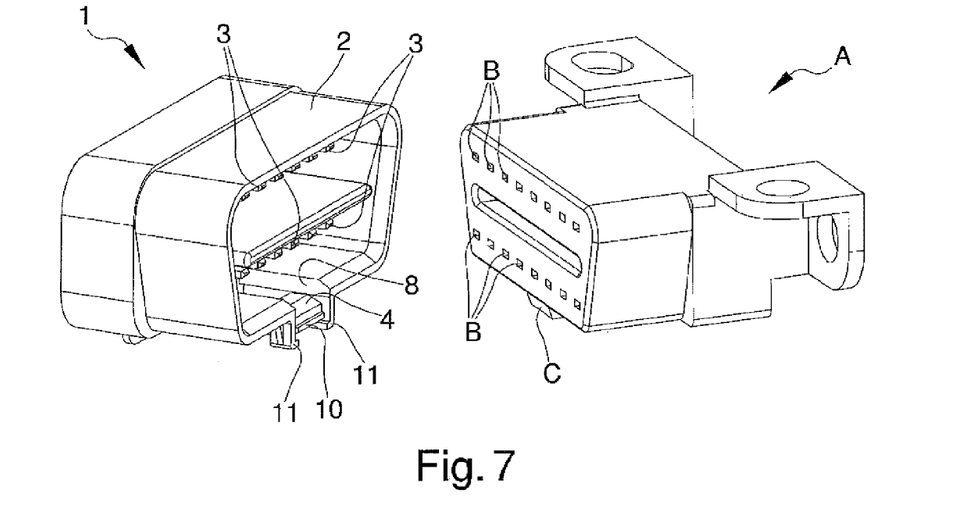
FIG. 7 is an axonometric view illustrating the connection of the connector according to the invention with a connection port of an on-board diagnostic system of a vehicle.
Figure 8:
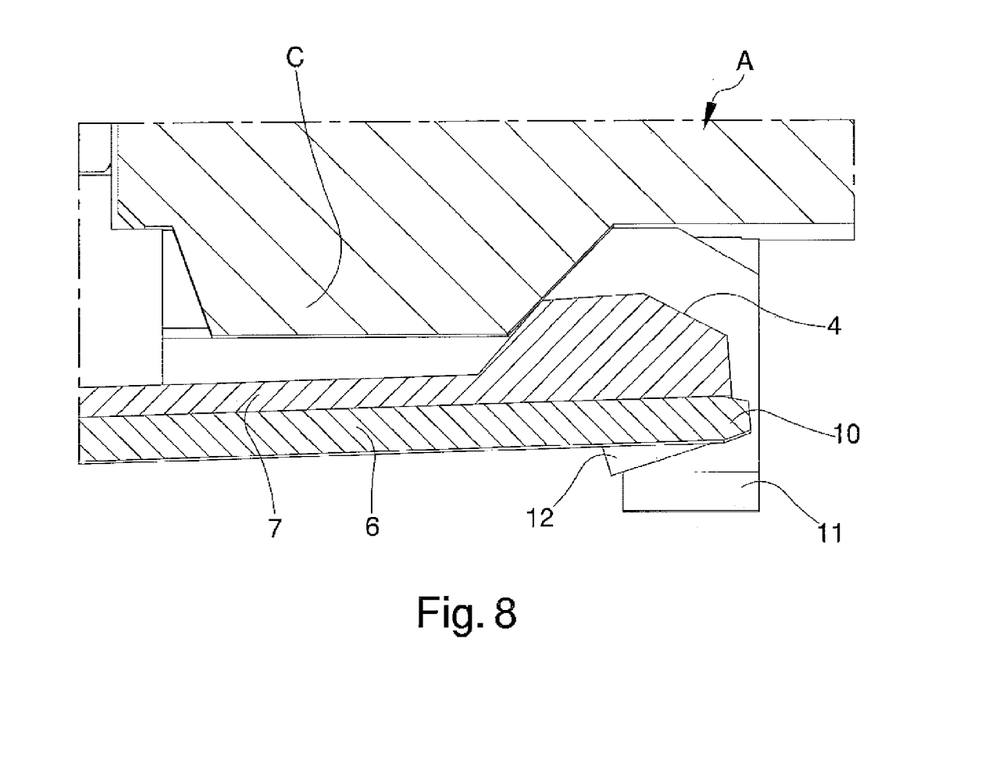
FIG. 8 is a side and section view illustrating the blocking of the protruding element of the connector according to the invention, blocked on a respective locator element of a connection port of an on-board diagnostic system of a vehicle.
Figure 9:
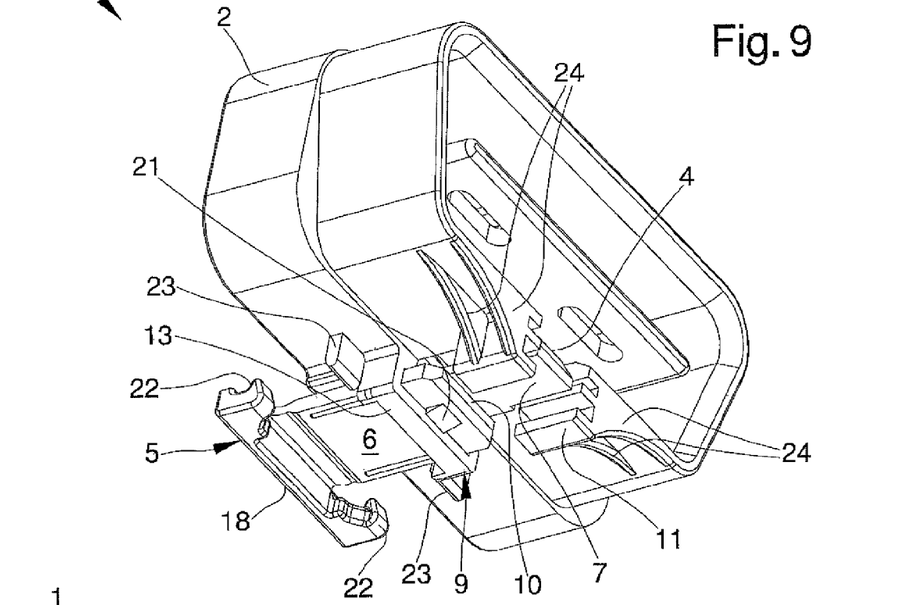
FIG. 9 is an axonometric view of a second possible embodiment of the connector according to the invention with the mobile element of the blocking means in the disengagement position.
Figure 10:
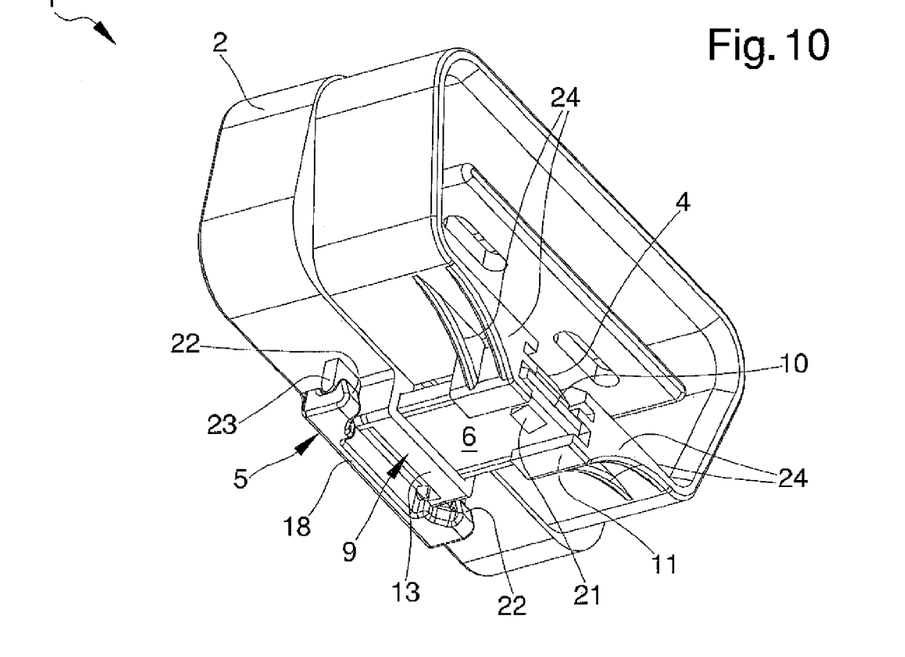
FIG. 10 is an axonometric view of the second possible embodiment of the connector according to the invention with the mobile element of the blocking means in the stop position.
Figure 11:
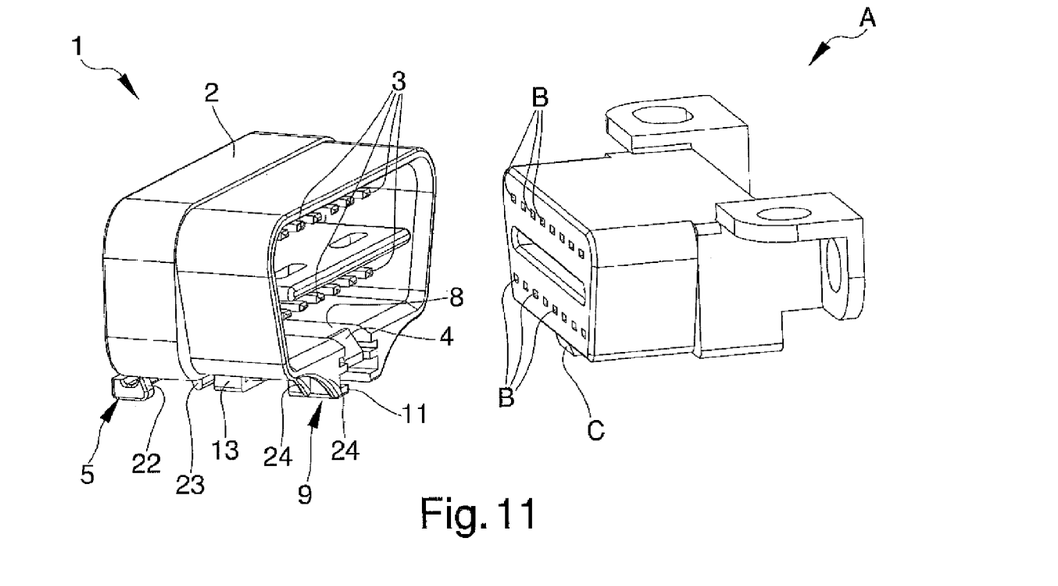
FIG. 11 is an axonometric view illustrating the connection of the connector in FIGS. 9 and 10 with a connection port of an on-board diagnostic system of a vehicle.
Figure 12:
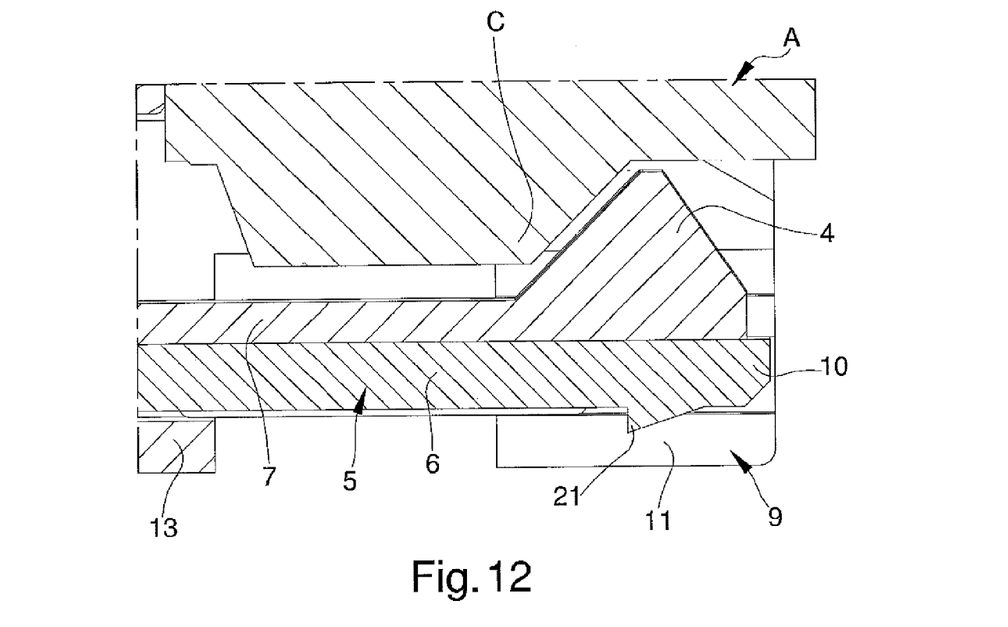
FIG. 12 is a side and section view illustrating the blocking of the protruding element of the connector in FIGS. 9, 10 and 11, blocked on a respective locator element of a connection port of an on-board diagnostic system of a vehicle.

The procedure for making the connector 1 comprises the following steps:
- making a container body 2 with a substantially tubular conformation;
- making a supporting element 17 with a substantially plate-shaped conformation and having a plurality of electrical terminals 3 on one side;
- arranging the supporting element 17 inside the container body 2, transversally with respect to the axis of extension of the container body itself, to define a housing seat 15 delimited by the wall of the supporting element 17 opposite to the electrical terminals 3 and by the perimeter wall of the container body 2;
- fitting an electric circuit 14 in the housing seat 15 and connecting the electric circuit 14 to the electrical terminals 3;
- filling the housing seat 15 with an insulating material 16, to block the supporting element 17 and the electric circuit 14 within the container body 2.

A second possible embodiment of the connector 1 is illustrated in Figures from 9 to 12.

In particular, in this second possible embodiment, the first section 11 of the straight guide 9 is formed by two substantially C-shaped cantilevered elements that extend from a wall of the container body 2, in correspondence of the edges of the opening 8.

The extremal portion 10 of the mobile element 6 comprises a single notch 21 which, in the disengagement position, does not engage in correspondence of the second section 13 of the straight guide 9.

Therefore, in the stop position the extremal portion 10 of the mobile element 6 is fitted to measure within the two C-shaped elements of the first section 11 of the straight guide 9 and prevents any bending of the flexible element, thereby blocking the tooth 4 on the respective locator element C.

Usefully, in the disengagement position, the notch 21 is able to engage in correspondence of the second section 13 of the straight guide 9, holding the mobile element 6.

Usefully, the gripping element 18 has suitable grip hooks 22 able to block on respective projections 23 made overhanging from the container body 2, when the mobile element 6 is in the stop position.

Usefully, the container body 2 also has appropriate reinforcement ribs 24 made overhanging from the container body itself on the sides of the first section 11 of the straight guide 9.

It has in practice been ascertained how the described invention achieves the proposed objects.

In particular, the fact is underlined that the blocking means, in particular the presence of the mobile element positionable in the stop position, allow to ensure a more secure and stable connection of the connector to the connection port of an on-board diagnostic system of a vehicle, so as to eliminate or minimize the risk of accidental detachment.

In particular, the disconnection of the OBD connector according to the invention can be made exclusively by means of a voluntary action by an operator.

Furthermore, the particular shape of the connector, as well as the relative procedure of realization, allow to simplify and speed up production. In particular, the procedure according to the invention allows to facilitate and speed up the positioning and fixing of the electric circuit to the container body of the connector.

The invention claimed is:

1. An on-board diagnostic (OBD) connector for the connection to OBD system of a vehicle, the OBD connector comprising:
   - a container body associable with an electronic connection port of the OBD system;
   - a plurality of electrical terminals supported by said container body and connectable to corresponding electrical terminals of the electronic connection port;
   - at least a protruding element associated with said container body and engageable with at least a respective locator element of the electronic connection port; and
   - a blocking means for preventing undesired disconnection of the connector itself from said electronic connection port;
   - an electric circuit adapted to process the electric signals transmitted to and/or received from the plurality of electrical terminals;
   - wherein the electric circuit is housed within a housing seat of the container body and connected to process electric signals transmitted and/or received through the plurality of electrical terminals;
   - wherein the housing seat is substantially filed with insulating material for isolating the electric circuit within the container body.

2. The OBD connector as recited in claim 1, wherein said blocking means comprises at least a mobile element associated with the container body and operatively connected to the protruding element, said mobile element being positionable in a stop position, wherein the protruding element is pressed and/or blocked with respect to the locator element.

3. The OBD connector as recited in claim 2, wherein the mobile element includes the protruding element and is slidingly associated with the container body between a disengagement position and the stop position, wherein the protruding element is substantially spaced away from the locator element.

4. The OBD connector as recited in claim 2 further comprises a flexible element which includes the protruding element and is associated with the container body, wherein the mobile element is slidingly associated with said container body between a disengagement position and the stop position, said mobile element being substantially spaced away from the protruding portion of said flexible element, and wherein said mobile element is engaged with said flexible element, in proximity of its protruding element, to press and/or block the protruding element with respect to the locator element.

5. The OBD connector as recited in claim 2, wherein the blocking means further comprises a guide means for sliding the mobile element between said disengagement position and said stop position.

6. The OBD connector as recited in claim 5, wherein the guide means comprises at least a straight guide.

7. The OBD connector as recited in claim 6, wherein the mobile element comprises at least an external portion capable of engaging with at least a first section of the straight guide while sliding from said disengagement position to said stop position to bring the mobile element toward the locator element.

8. The OBD connector as recited in claim 7, wherein at least one of the external portion or the first section of the straight guide comprises an inclined section.

9. The OBD connector as recited in claim 1, wherein the insulating material is composed of at least one of a synthetic resin and silicone.

10. The OBD connector as recited in claim 1, wherein the insulating material is filled on top of the electric circuit to block the supporting element and the electric circuit within the container body.

* * * * *